United States Patent [19]
Garber

[11] 3,768,132
[45] Oct. 30, 1973

[54] FABRICATION OF HEAT EXCHANGER TUBE BUNDLES

[75] Inventor: Daniel C. Garber, Overbrook Hills, Pa.

[73] Assignee: Sun Shipbuilding & Dry Dock Company, Chester, Pa.

[22] Filed: Nov. 2, 1971

[21] Appl. No.: 194,860

[52] U.S. Cl................. 29/157.3 R, 29/202 D, 90/4
[51] Int. Cl....................... B23p 15/26, B23p 15/16
[58] Field of Search ............... 29/157.3 R, 157.3 B, 29/202 D; 90/4

[56] References Cited
UNITED STATES PATENTS

| | | | |
|---|---|---|---|
| 2,270,864 | 1/1942 | Blais............................ | 29/157.3 R X |
| 2,417,662 | 3/1947 | Rosales....................... | 29/157.3 R X |
| 2,443,577 | 6/1948 | Finlay ............................ | 29/157.3 R |
| 2,577,123 | 12/1951 | Hitchens et al............ | 29/157.3 R X |
| 2,793,835 | 5/1957 | Woods....................... | 29/157.3 R X |
| 2,316,367 | 4/1943 | Schurr et al............................. | 90/4 |

*Primary Examiner*—Charles W. Lanham
*Assistant Examiner*—D. C. Reiley, III
*Attorney*—George L. Church et al.

[57] ABSTRACT

All-welded heat exchanger tube bundles, with integral mounting flanges, are fabricated by first flaring the ends of the tubes and then machining, by a rack hobbing process, three weld prep surfaces, arranged as half a hexagon, on the flared ends of the tubes. The machining is performed on one complete row of tubes at a time and, at the same time, the ends of solid stubs (which eventually become the mounting flanges) are similarly machined. A machining operation is performed on both an unwelded row of tubes, held in a fixture, and on a previously welded array of tubes in the tube bundle; after both of these operations, the two groups of weld prepped tubes may be welded together to add the new row of tubes to the bundle.

11 Claims, 30 Drawing Figures

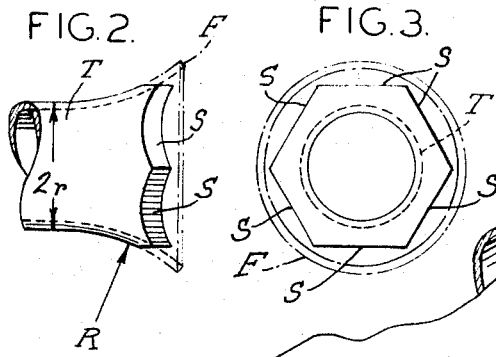
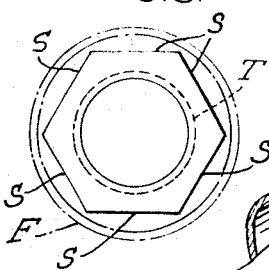
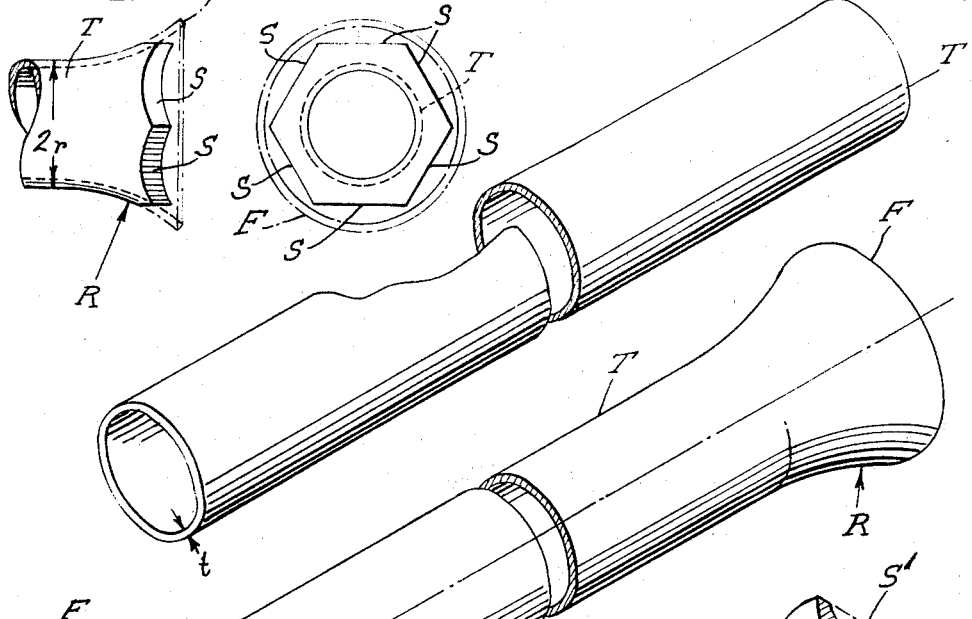
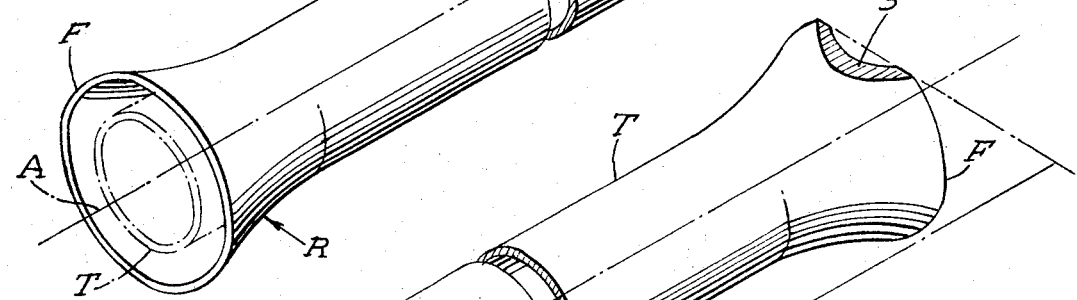
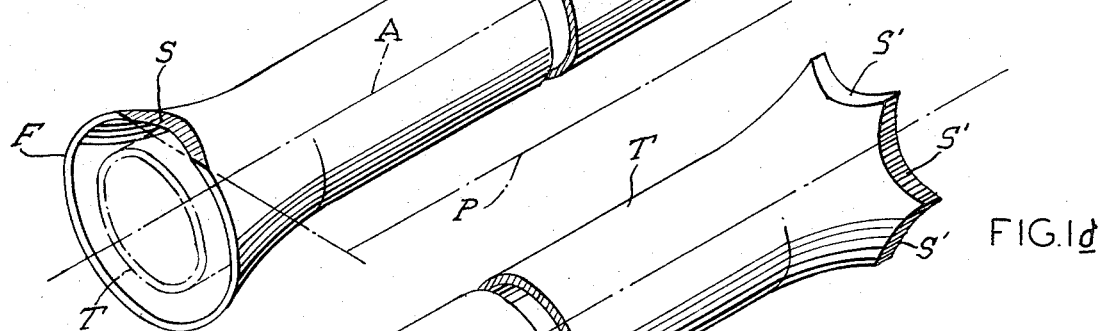
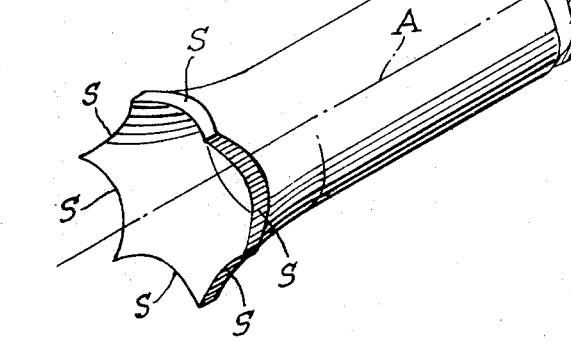

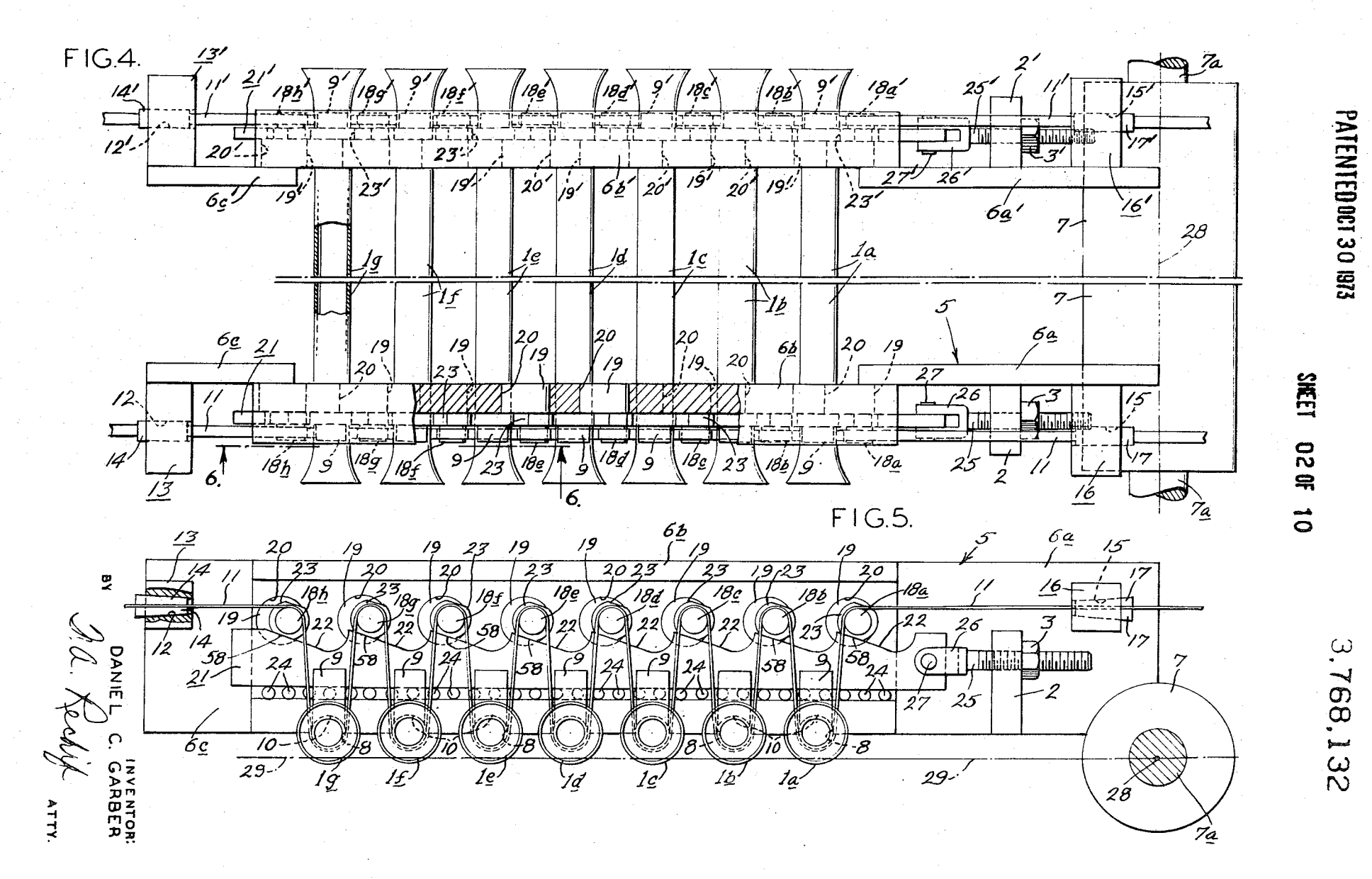

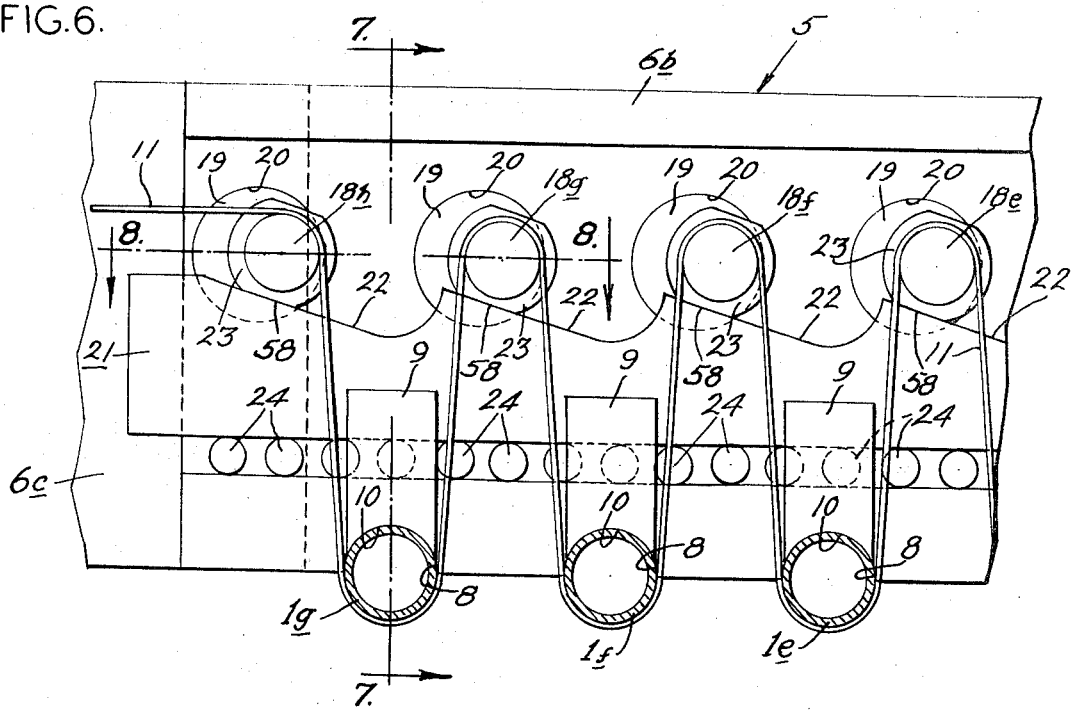
FIG.6.
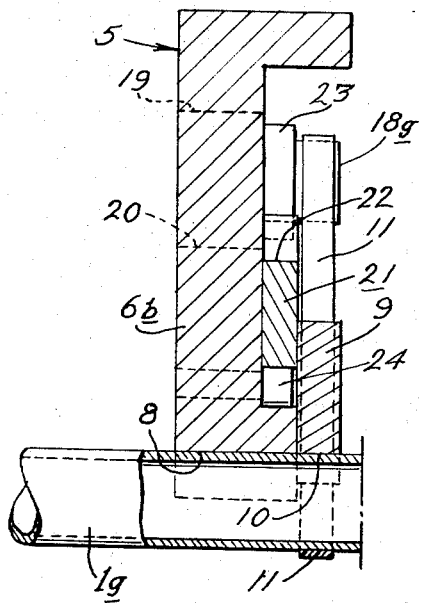
FIG.7.
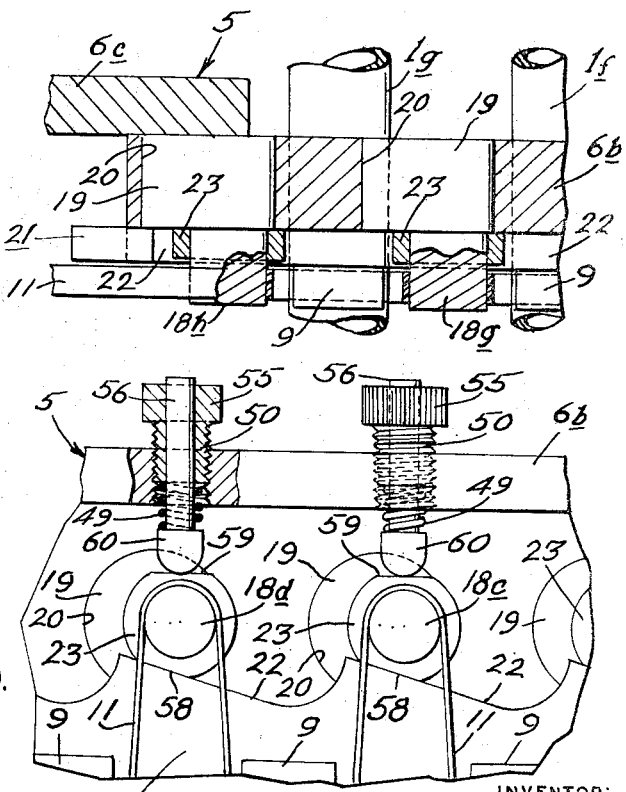
FIG.8.
FIG.9.
INVENTOR:
DANIEL C. GARBER
BY
ATTY.

INVENTOR:
DANIEL C. GARBER

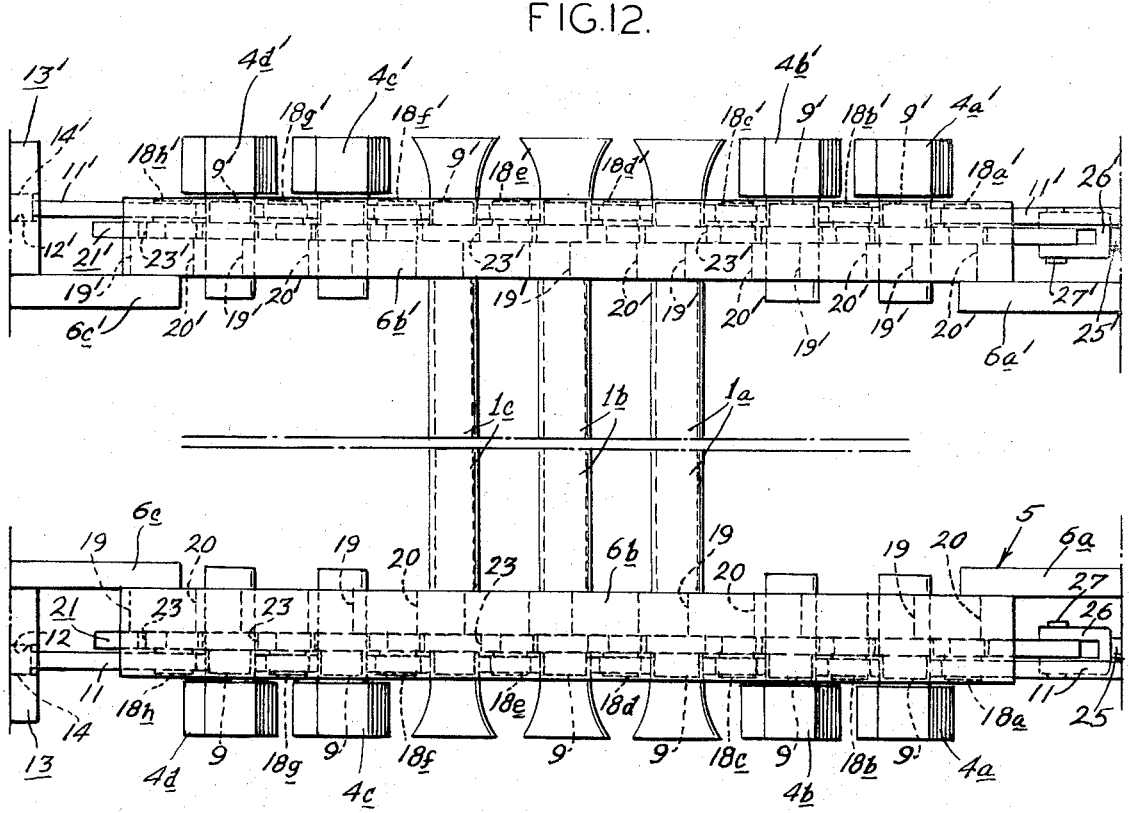
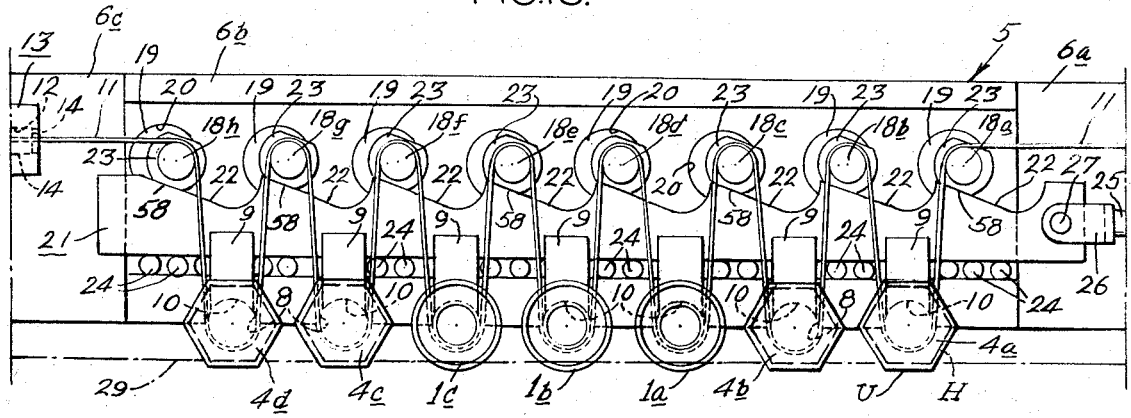

INVENTOR:
DANIEL C. GARBER
BY
ATTY.

INVENTOR:
DANIEL C. GARBER
ATTY.

INVENTOR:
DANIEL C. GARBER
ATTY.

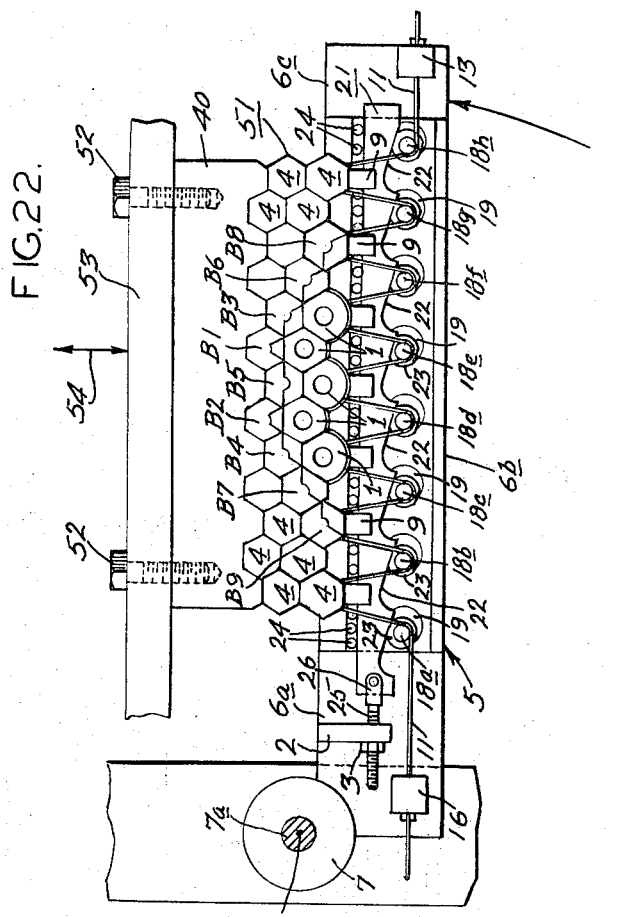

FABRICATION OF HEAT EXCHANGER TUBE BUNDLES

This invention relates to the fabrication of heat exchanger tube bundles, and more particularly to a method and apparatus used for the fabrication of such bundles.

In a conventional shell-and-tube heat exchanger, the heat exchanger tubes are ordinarily supported at their opposite ends by means of respective tubesheets, the tubes passing through holes drilled in the tubesheets and the outer ends of the tubes being rolled or welded into the sheets to provide the necessary sealing or fluid isolation between the tubes (or the headers at each end of the shell) and the interior of the shell. This construction has several drawbacks or disadvantages, among which are: (1) The sheets are high in first cost. (2) The drilling of a multiplicity of small holes (there may be as many as 10,000 tubes in the bundle, for example) in the sheets is costly. (3) With the rolled tube-in-sheet construction, crevices are commonly formed around the tubes, at the back side of the tubesheet; these crevices form stagnant areas which rapidly corrode. Corrosion-preventing coatings cannot be used in these crevices since there is relative motion between the tube and sheet (thermally induced, for example) which quickly flakes off the coating.

An object of this invention is to provide a novel method and apparatus for fabricating a sheet-less tube bundle, which eliminates the above-mentioned drawbacks.

Another object is to provide a novel method and apparatus for fabricating an all-welded tube bundle construction.

A further object is to provide a method for fabrication of heat exchanger tube bundles, which enables a saving in time and money as compared with more conventional methods.

The objects of this invention are accomplished, briefly, in the following manner: The tubes to make up the tube bundle are first cut to length, faced, and flared on both ends; following this, the flared tubes, plus any solid stub ends which may be needed for mounting flanges, are loaded in one row in tube shuttle fixture or jig and are clamped to it. Using a rack hob, three weld prep surfaces arranged as half a hexagon, are machined on the bottom halves of the flared tube ends, and on the solid stub ends in the tube shuttle. Simultaneously, the ends of the flared tube weld preps are deburred by burring cutters. The solid stub end weld preps are manually deburred; however, they could be machine deburred, and even machined in place (with special attachments).

Using quite similar machining and deburring techniques, three weld prep surfaces, arranged as half a hexagon, are machined on the bottom halves of the flared tube ends and solid stub ends on the bottom rows of the tube bundle. When the weld preps have all been completed, the tube shuttle is rotated 180° (indexed) into position under the tube bundle, and clamped in position for welding. Through penetration butt welds are made along each of the three sides of the weld preps on each tube (or stub end) and along the abutting weld preps on the tube bundle bottom.

In the present specification, the expression "half hexagonal weld preps" may be used; this expression is intended to mean three weld prep surfaces arranged as half a hexagon, which is to say half-hexagonal-prism weld preps, or half-hexagonal-prism surfaces.

A detailed description of the invention follows, taken in conjunction with the accompanying drawings, wherein:

FIGS. 1a, 1b, 1c, and 1d are isometric views which illustrate various steps in the fabrication of a single heat exchanger tube according to the invention;

FIG. 2 is a side view of one end of a finished tube;

FIG. 3 is a front view of a finished tube;

FIGS. 4 and 5 are, respectively, a plan view and a front elevation of a tube shuttle (fixture) used in the fabrication of a heat exchanger tube bundle, with a plurality of heat exchanger tubes mounted therein;

FIG. 6 is a sectional view taken on line 6—6 of FIG. 4;

FIG. 7 is a sectional view taken on line 7—7 of FIG. 6;

FIG. 8 is a sectional view taken on line 8—8 of FIG. 6;

FIG. 9 is a view similar to FIG. 6 but illustrating a spring return arrangement which may be used in the tube shuttle;

FIG. 12 is a plan view similar to FIG. 4 but showing both tubes and solid stubs mounted in the fixture, ready for the machining of weld preps;

FIG. 13 is a front view of the FIG. 12 assembly,

FIG. 21 is a schematic front elevation of an apparatus which may be used for the fabrication of tube bundles according to the present invention;

FIG. 22 is a view similar to FIG. 21 but showing a different position of the fabrication apparatus;

FIG. 23 is a front or face view of a solid stub preformed with curved surfaces according to this invention;

FIGS. 24 and 25 are side views of the stub of FIG. 23;

FIG. 26 is a sectional view taken on line 26—26 of FIG. 23; and

FIG. 27 is a sectional view taken on line 27—27 of FIG. 23.

Figure 10:
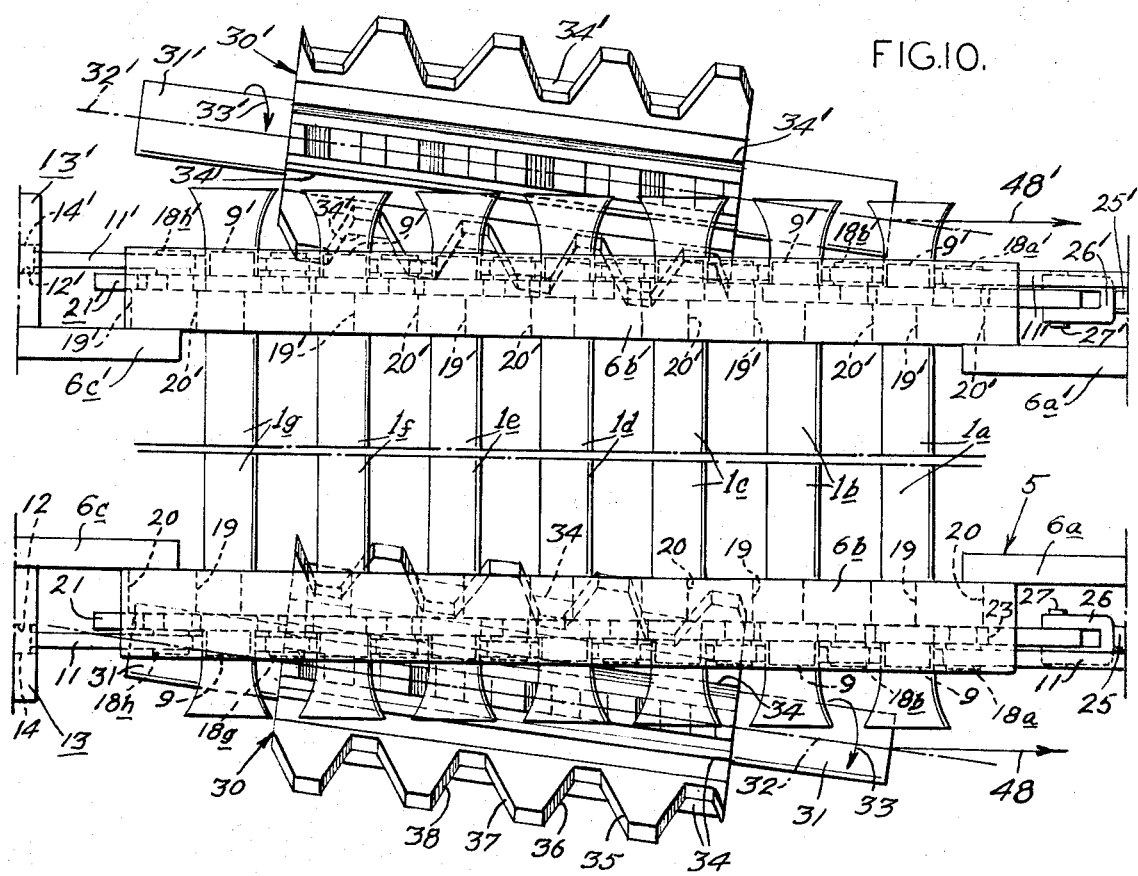
FIG. 10 is a plan view illustrating apparatus for machining weld preps on the ends of heat exchanger tubes, using rack hobs.

The present invention is concerned with a process and apparatus useful for the fabrication of all-welded heat exchanger tube bundles. That is to say, no tubesheet is used, and there is no rolling of tubes into (or securing of tubes in) holes drilled in a tubesheet, instead, adjacent tubes are welded together at their adjoining edges to provide the necessary sealing, and a formed, shaped solid body is welded around the outermost tubes to provide the filling-out of the bundle to the desired cylindrical outer configuration and to provide the necessary flanging.

FIGS. 1a–1d (taken with FIGS. 2 & 3) illustrate, for preliminary reference purposes, various steps in the fabrication of a single heat exchanger tube which is to be incorporated into a tube bundle. Each metallic heat exchanger tube such as T is first cut to length, as illustrated in FIG. 1a. The tube wall thickness is $t$.

Then, the tubes T are faced and flared (outwardly) on both ends, as illustrated in FIG. 1b. It is important to note, in connection with the flaring, that the flared surfaces F have outwardly concave (curved) shapes with a radius R, so that these surfaces are bell-shaped, rather than being frustoconical. The radius R is preferably equal to $3r$, where $r$ is the tube O.D. radius (FIG. 2).

Next, weld preps are machined on the flared ends of the tubes, so that each tube may be welded into the tube bundle. For complete welding of each tube into the bundle, six surfaces arranged as a regular hexagon are machined on each end of the flared tube, these surfaces all being parallel to the longitudinal axis of the tube. As will be explained in detail hereinafter, the machining of the (six weld prep) surfaces is actually carried out in several separate steps, using a specified fixture and a specified machine tool; however, for the present the full hexagon (six surfaces) will be referred to. In FIG. 1c, the machining of one surface (of the six) at each end of the tube T is illustrated. A cutting plane P is parallel to the tube longitudinal axis A, the intersection of this plane with the flared surface at one end of the tube T providing a weld prep surface S and the intersection of this plane with the flared surface at the other end of tube T providing a weld prep surface S'. The surface S is one of the six surfaces S (arranged as a hexagon) which are eventually machined on one end of the flared tube T; surface S is parallel to the tube axis A. Similarly, the surface S' is one of the six surfaces (arranged as a hexagon) which are eventually machined on the other end of the flared tube; surface S' is also parallel to the tube axis A.

FIG. 1d illustrates a heat exchanger tube with six surfaces S (arranged as a hexagon, and including surface S as one of the six) machined on one end of the flared tube, and six surfaces S' (also arranged as a hexagon, and including surface S' as one of the six) machined on the other end of the flared tube. All of these machined surfaces serve as weld preps, as explained more fully hereinafter, for welding of each heat exchanger tube into the tube bundle. FIGS. 2 and 3 illustrate one end of the flared and weld-prepped tube T, with the surfaces S.

Refer now to FIGS. 4–9, which illustrate a holding means (tube shuttle) for holding and manipulating a plurality of cylindrical members (such as the tube T previously referred to) to be incorporated into a heat exchanger tube bundle. It is assumed that the tubes to be incorporated into the tube bundle (seven tubes 1a–1g being illustrated, each tube being similar to the tube T) have already been cut to length, then faced and flared on both ends, as previously described in connection with FIGS. 1a and 1b. For machining of the weld preps and for further manipulation, the flared tubes are loaded in a holding means (tube shuttle) which is denoted generally by numeral 5.

The tube shuttle or fixture 5 is founded upon a rigid elongated frame having two slab-like end portions 6a and 6c and a central portion 6b, rigidly secured together. One end of portion 6a is secured to a cylindrical shaft 7 which is journaled for rotation about a substantially horizontal axis 28, as by means of two opposite smaller (stub) shafts 7a which are mounted each in a fixed support (not shown). Actually, the complete shuttle 5 is dual, including two similar holding structures, one at each of the two respective opposite ends of the flared tubes. Since these two structures are duplicates, only one will be described in detail. Structural elements at the other side of the fixture 5 (not described in detail) which are similar to those at the side described in detail are denoted by the same reference numerals, but carrying prime designations.

The frame portion 6b is C-shaped in vertical cross-section (see FIG. 7), and carries along its lower edge a plurality of spaced, parallel, curved (semicircular) member-receiving grooves 8 whose centers of curvature all lie substantially in a common plane; the curvature of the grooves 8 matches the curvature of the outer cylindrical surface of the unflared portion of members 1a–1g, and there is one groove for each respective one of the members to be held, so the frame 6a–6c has a capacity of seven cylindrical members. An integral block 9 extends outwardly from the front edge of frame portion 6b in alignment with each respective groove 8 to provide a plurality of parallel, spaced, curved member-receiving elements; each block 9 has a groove 10 in its lower surface which exactly matches the corresponding groove 8 and is aligned therewith to in effect form an outward continuation thereof.

A plurality of cylindrical members (such as flared tubes 1a–1g), the maximum number of members being determined by the capacity of the holding means 5 (as governed by the number of items 8–10 provided in frame portion 6b), are loaded into the holding means to constitute a row of members which is to be added to or joined to other members assembled in a heat exchanger tube bundle, and which row of members is held by the holding means (shuttle, or jig) 5 until the members are joined to the bundle.

The flared tubes 1a–1g (or other cylindrical members which are to be welded to the tube bubdle) are mounted each in a respective one of the grooves 8, 10, with their axes parallel to the grooves, to constitute a row, the axes of the tubes all lying substantially in a common plane, and are firmly held in the grooves by means of a continuous length of tensioned or stressed tape 11 (either a high-strength woven metal tape, or a high-strength glass fiber tape) which passes around each one of the members 1a–1g mounted in the fixture 5, at the respective blocks 9.

At one end, the tape 11 passes through a tapered (wedge-shaped) opening 12 cut through a rigid block 13 which is secured to frame portion 6c and projects forwardly therefrom. Tape 11 is secured to the fixed block 13 by clamping the same between a pair of wedge-shaped blocks 14 which are adapted to tightly engage the opposite walls of opening 12. At its opposite end, tape 11 passes through a tapered opening 15 cut through a rigid block 16 which is secured to frame portion 6a and projects forwardly therefrom. Tape 11 is secured to the fixed block 16 by clamping the same between a pair of wedge-shaped blocks 17 which are adapted to tightly engage the opposite walls of opening 15.

From its right-hand or block 16 end, the tape 11 extends more or less horizontally to the left, then over the top of an eccentric pin 18a, then down and under the flared tube 1a (at its block 9), then up and over another eccentric pin 18b, then down and under the flared tube 1b (at its block 9), and so on--up and over eccentric pin 18c, down and under the flared tube 1c, up and over eccentric pin 18d, down and under the flared tube 1d, up and over eccentric pin 18e, down and under the flared tube 1e, up and over the eccentric pin 18f, down and under the flared tube 1f, up and over eccentric pin 18g, down and under the flared tube 1g, up and over eccentric pin 18h, and then substantially horizontally to block 13. Thus, for a shuttle having a capacity of seven tubes or cylindrical elements, eight eccentric pins are required, or for n tubes, ($n + 1$) pins are required.

Each of the pins 18a–18h is integral with, but eccentrically located with respect to the center of, a respective solid cylindrical body 19. Each of the bodies 19 is rotatably mounted within a respective aperture 20 which is drilled through the vertical face of the central frame portion 6b.

A generally sawtooth-shaped cam member 21, having a plurality of inclined planar surfaces 22, one such surface for each of the pins such as 18a, 18b, etc., which are contemplated (which means that in FIGS. 4–8 there would be a total of eight such surfaces), is positioned in front of the vertical face of frame portion 6b, between this face and the tape 11. Each of the pins 18a, 18b, 18c, etc., rotatably carries a respective bushing 23 which is adapted to ride on a respective, corresponding one of the camming surfaces 22. The bushings 23 are of generally cylindrical configuration, but each may be provided with a "flat" 58 which rides on the corresponding camming surface 22.

The cam member 21 is elongated, and is positioned edgewise in the frame portion 6b. See FIG. 7. At one edge, member 21 has the sawtooth shape (including the inclined planes or camming surfaces 22) previously described; the opposite edge of member 21 is planar and rests on a multiplicity of anti-friction rollers 24 which are disposed between the planar edge of member 21 and the upwardly facing interior face of frame portion 6b. These rollers 24 provide for back-and forth sliding movement of member 21, in a direction perpendicular to the axes of members 1a–1g (which would be in the horizontal direction in FIG. 5).

Once tape 11 has been wound around the various items as described and secured at its ends in blocks 13 and 16 as aforesaid, movement of cam member 21 toward the right in FIGS. 4–5 will cam all of the pins 18a, 18b, etc., upwardly (rotating the bodies 19 in the counterclockwise direction, viewed as in FIG. 5), increasing the tension in the tape 11 and tightening the tape on the members 1a–1g. On the other hand, movement of cam member 21 toward the left in FIGS. 4–5 allows all of the pins 18a, 18b, etc., to move downwardly, thus decreasing the tension in the tape 11. Thus, it may be seen that the tape 11 may be tightened to hold the members 1a–1g securely in the fixture 5, and may be loosened (and eventually removed) to allow these members to be separated from the fixture.

As will be disclosed presently, means are provided for moving the cam member 21 in the direction of its length (to tighten or loosen the tape 11, depending on the direction of movement of this cam member). In FIG. 9, there is disclosed a possible structural arrangement (to wit, a spring return arrangement) for making certain that the pins 18a, 18b, etc., remain in engagement with the camming surfaces 22 (thereby to cause these pins to move downwardly, to decrease the tension in tape 11) as cam member 21 moves toward the left in FIG. 5.

Referring now particularly to FIG. 9, each of the bushings 23 may be provided with a "flat" 59 which is generally parallel to the upper face of frame portion 6b. A separate spring-loaded plunger 60 presses on each respective one of the "flats" 59, to urge each bushing 23 into firm engagement with its respective camming surface 22. One end of a coiled compression spring 49 bears against each respective plunger 60, on the side thereof opposite the bushing 23, and the other end of each of these springs 49 bears against a corresponding threaded insert 50 which is threadedly mounted in the overhanging lip of frame portion 6b, in alignment with the respective bushing 23. The threaded inserts 50 may be rotated to adjust the force exerted by the springs 49, as by means of a knurled hand grip 55 integrally located at the upper end of each insert 50, above the frame portion 6b. Each of the plungers 60 is integral with a respective pin 56 which extends upwardly from the plunger and passes loosely through a central bore in each respective insert 50 and hand grip 55; each spring 49 surrounds its respective pin 56.

In order to provide the requisite mechanical force for moving the cam member 21 in the direction of its length, a pin 25 having an integral bifurcated end portion 26 is utilized. The bifurcated end portion 26 spans and is rigidly secured to one end of member 21, as by means of a pin 27. The shank of pin 25 is threaded and passes through a hole provided in a bracket 2 which is attached to frame portion 6a, while a nut 3 is threaded onto pin 25 and bears against bracket 2, on the side thereof opposite the bifurcated end portion 26. Thus, the nut 3 may be rotated to draw cam member 21 toward the right in FIGS. 4 and 5, thereby to tighten the tape 11 on members 1a–1g. Of course, nut 3 may also be rotated in the opposite direction, to allow cam member 21 to move toward the left and loosen the tape.

The tape 11 is tightened on members 1a–1g, in the manner previously described, in order to fasten such members to the shuttle 5 during the forming thereon of the weld preps, as well as thereafter, until this row of members is welded in place in the tube bundle being fabricated. After such welding of the members, nut 3 is rotated to loosen or remove the tension from the tape, and then, after removal of blocks 14 and 17, the tape 11 is withdrawn completely from the shuttle 5, in the direction of the tape length. The tape may then be used for the next succeeding row of members (for securing such latter members to the shuttle), and is nonexpendable.

In the case of cylindrical members of very small diameter, it may be desirable to use some means other than a tape for securing such members to the shuttle. For example, the tubes could be stitched (by power-stitching) to the elements 6b and 9, in which case the thread used would be expendable, being broken after the members are welded into the tube bundle, to withdraw the shuttle for re-loading.

Since the shuttle in FIGS. 4–8 has a capacity of seven cylindrical elements (e.g., flared tubes), there are eight eccentric pins such as 18a–18h at each side of the fixture, and each of the two cam members such as 21 has eight inclined planes or camming surfaces such as 22, on which the individual pin-carried bushings 23 respectively ride.

The two frame portions 6a and 6a' are both secured to the shaft 7, so that the entire dual fixture (together with the row of seven tubes carried thereby) may be rotated as a unit by means of this shaft. The substantially horizontal axis about which shaft 7 rotates is denoted by numeral 28. A cutting plane, to be further referred to hereinafter, is indicated by numeral 29. This cutting plane passes through the shaft axis or center line 28 (see FIG. 5).

According to this invention, half hexagonal surfaces (forming weld preps), parallel to the tube axis, are machined (formed) on the bottom halves of the flared tube ends, while the tubes are held in a row in the dual shuttle 5. This machining or forming (which is done on both ends of the tubes simultaneously) makes use of the rack hobbing process, utilizing separate rack hobs (cutters) for each end of the tubes. The forming of these half hexagonal surfaces on the tubes in the row, by means of rack hobbing, is done upon a single pass of the rack hob past the row of tubes.

Figure 11:
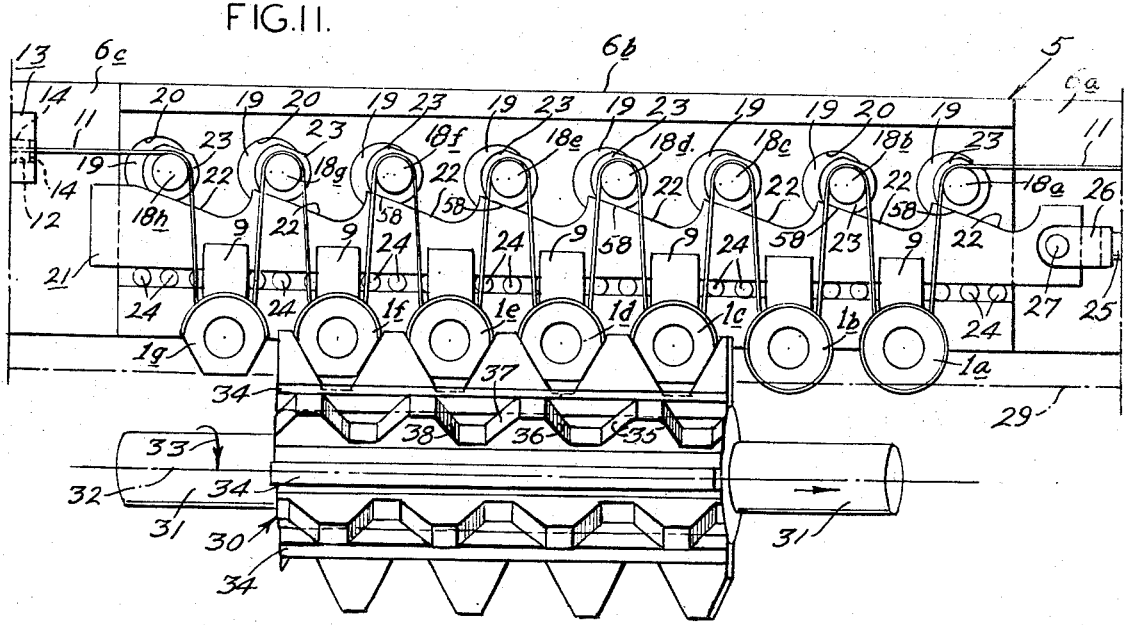
FIG. 11 is a front elevation of the apparatus of FIG. 10.

Refer now to FIGS. 10–11, which illustrate the machining of the weld preps by rack hobs, while the tubes 1a–1g are held in the dual shuttle 5. The seven flared tubes 1a–1g are mounted in a row in the dual shuttle 5, as previously described in connection with FIGS. 4–9, and are firmly secured therein by means of the tapes 11 and 11'. After this is done, a rack hob 30, which is carried by a slide as will be later described, is slid into position under the tube shuttle 5, at one side thereof, and a similar rack hob 30' is slid into position under the dual tube shuttle or fixture 5, at the other side thereof. Rack hob 30 is adapted to machine the half hexagonal weld preps on one end of each of the seven aligned elements 1a–1g, and rack hob 30' is adapted to carry out a similar operation on the other end of the seven aligned elements. Since the rack hobs 30 and 30' are exactly similar, only one (hob 30) will be described in detail. The rack hob 30 is keyed to and rotated by a shaft 31. The axis 32 of shaft 31 makes a suitable acute angle (measured in a horizontal plane) with a line drawn through the extreme ends of all the tubes 1a–1g. It is assumed that the axes of tubes 1a–1g all lie in a common plane parallel to the horizontal plane 29, during the machining operation.

In addition to being rotated in the direction 33 by the shaft 31 (which latter is rotatably driven by a suitable source of motive power, that is, by a rack hob drive), the rack hob 30 is fed at a suitable rate parallel to the ends of tubes 1a–1g by means of a helix or lead screw driving arrangement, so that the rack hob makes a "pass" (in a direction generally at 90° to the axes of the tubes) along the row of tubes 1a–1g; this "pass" is made in a direction from left to right in FIGS. 10–11, in the direction of arrow 48 (FIG. 10).

The rack hob 30 utilizes a plurality of cutters or cutting teeth which are distributed both circumferentially and longitudinally with respect to shaft 31. In rack hob 30, a plurality of knife-like cutters 34 function to provide the machining of the one surface of the half hexagon which is parallel to the cutting plane 29. Cutters 34 are circumferentially spaced with respect to shaft 31, and each extends more or less parallel to the axis 32, these cutters thus providing the appearance of splines on shaft 31.

Interspersed between each pair of adjacent cutters 34 is a row of cutting teeth, all of which rows, taken together, function to provide the machining of the two surfaces of the half hexagon which are at 60° from the cutting plane 29. Typical of these last-mentioned cutting teeth are the paired teeth 35 and 36, whose active surfaces are located at their leading edges; also the paired teeth 37 and 38, whose active surfaces are likewise located at their leading edges. The teeth 35–38, as well as additional teeth not specifically referred to, are all located in a single row, between the same pair of adjacent cutters 34. As previously stated, a row of cutting teeth similar to teeth 35–38, etc., is located between each pair of adjacent cutters 34.

The rack hob 30, as it rotates in the direction 33 and simultaneously moves as at 48 past the row of tubes 1a–1g (in a direction generally at 90° to the axes of the tubes), machines (in a single pass past the row of tubes) three surfaces arranged as half a hexagon on one end of each of the tubes, the three surfaces in each case being parallel to the respective tube axis and the half hexagon resulting being formed on the bottom half of each tube. In the position of the rack hob 30 illustrated in FIGS. 10–11, the machining of tubes 1a and 1b has not yet commenced; the machining of tube 1c is just beginning; the machining of tube 1g has been completed; and the machining of tubes 1d, 1e, and 1f is in intermediate stages of completion.

While the rack hob 30 is machining the half hexagonal surfaces on one end (to wit, the lower end in FIG. 10) of the row of flared tubes 1a–1g, the similar rack hob 30' is operating upon the other end of these tubes. That is to say, the rack hob 30' likewise machines (in a single pass past the row of tubes 1a–1g) three surfaces arranged as half a hexagon on the other end (to wit, the upper end in FIG. 10) of each of the tubes, the three surfaces in each case again being parallel to the respective tube axis and the half hexagon resulting being formed on the bottom half of each tube.

In FIG. 10, the axis 32' of shaft 31' is illustrated as being parallel to the axis 32 of shaft 31, and the direction of rotation 33' (of shaft 31') is illustrated as being the same as the direction of rotation 33 of shaft 31. However, it is preferable (in order to balance the endwise or longitudinal forces exerted on tubes 1a–1g, during the rack hobbing operation) to rotate shaft 31' in the direction opposite to direction 33', and also to make the acute angle (measured in a horizontal plane) between axis 32' and a line drawn through the extreme upper ends of the tubes in FIG. 10, opposite in sense to the direction actually illustrated in FIG. 10, that is, so that axis 32' points upwardly at a small angle, looking from left to right in FIG. 10.

Instead of using the rack hobbing process previously described for forming the half hexagonal surfaces on the ends of tubes 1a–1g, a grinding procedure (such as the so-called Reischaur procedure) could be utilized for forming such surfaces. This latter procedure would be advantageous when very hard materials are used for the tubes, or when the physical properties of the tube material are adversely affected by heat such as that occurring during welding.

The half hexagonal surfaces formed or machined as above described, on the ends of the tubes 1a–1g, provide weld preps which enable the row of tubes to be welded into a heat exchanger tube bundle which is being fabricated.

Simultaneously with the machining of the weld preps by the rack hobbing process as previously described, the weld preps are deburred by synchronized end cuttings tools. This will be further described hereinafter.

Since this invention envisages an all-welded tube bundle construction and the elimination of tubesheets, it is contemplated that the structure necessary for filling out the irregular (polygonal, bounded by hexagonal surfaces) outer boundary of the tube bundle to the desired cylindrical outer configuration, as well as the mounting flanges (for mounting the tube bundle in an outer shell) may be built up from welded-together solid stubs (made from bolt stock). The solid stubs, as prepared for fabrication into the heat exchanger, have hexagonal heads (of greater axial length than an ordinary bolt) and cylindrical shanks; they may be machined from hexagonal or cylindrical bar stock, or from a hexagonal-headed round bar. See FIGS. 23–27.

For weld prepping, the solid stubs (as required for one complete row in the finished structure) are mounted in the shuttle 5 along with the appropriate number of flared tubes, and the machining of the weld preps on both tubes and solid stub ends is performed on one complete row at a time and in one pass of the rack hob previously described.

Solid stubs which, in the finished structure, are welded only to other solid stubs along all six hexagonal faces, have all six hexagonal faces planar when they are mounted in the shuttle for weld prepping (by rack hobbing). Such stubs may be termed "finished stock."

However, some stubs, in the finished structure, are welded to tubes, and this may be called for along either one, two, or three sides, or even more, up to and including six sides. Such solid stubs, before being mounted in the shuttle 5, are formed (which is to say, they are preformed) along either one, two, or three (or up to six) sides of the hexagon (as called for) with curved (outwardly concave) surfaces having a radius R (FIG. 1b, this radius R being 3r) matching that of the flared tube ends, and also with weld prep surfaces such as those illustrated in FIGS. 1c and 1d, and in addition with an arcuate groove having a depth of r/2.

Refer now to FIGS. 23–27, which illustrate a solid stub which is to be welded to tubes along two sides of the hexagon, and is therefore preformed (by machining) to form special surfaces along two sides of the hexagon. The stub illustrated may thus be used (in the assembled heat exchanger tube bundle) at locations such as B3, B6, B8, etc., in FIG. 14 (later described in more detail).

The solid stub, denoted generally by numeral 43, is made of a suitable metal, with a cylindrical shank 44 of radius r (equal to the O.D. radius of tube T, see FIGS. 2 and 24), and of a suitable length (typically 2 inches). At one end, the stub has originally a head 45 of regular hexagonal shape, with the distance between opposite "flats" of the hexagon being equal to 2.5r, typically, after machining; this distance actually depends on the space required between tubes for heat transfer, etc.

At the head end, the stub 43 is formed with an outwardly concave (curved) shape of radius R (see FIG. 26); this radius R is preferably equal to 3r. For the stub 43, this outwardly concave surface encompasses 120° of the circumference of the stub shank. If special surfaces were to be formed along only one side of the hexagon (such as, for example, required at locations B1, B2, B10, etc., of FIG. 14), the outwardly concave surface would encompass 60° of the circumference of the stub shank; if special surfaces were to be formed along three sides of the hexagon (such as, for example, required at locations B5 and B22 of FIG. 14), the outwardly concave surface would encompass 180° of the circumference of the stub shank.

The stub 43 has machined thereon, at the outwardly concave surface area thereof, two surfaces 46 which appear as curved-edged surfaces when seen in side elevation as in FIG. 25. Each of the surfaces 46, like the surfaces S in FIGS. 1c–1d, comprises the intersection of a cutting plane parallel to the stub longitudinal axis with the concave surface previously described and with the radially-outer boundary of a groove 47 to be later described; each of the surfaces 46 is formed by a respective cutting plane, both planes being parallel to the stub longitudinal axis but each of the two planes extending in a direction parallel to (actually, coplanar with) a respective one of the two (adjacent) faces of the original hexagonal head. The curved-bounded surface 46 formed on the stub thus will, when finish machined, exactly match a respective pair of surfaces S formed on tubes T by rack hobbing, as previously described.

It is pointed out that the solid stubs used in the finished structure (heat exchanger bundle) may be formed with one, two, or three (or more, up to and including six) weld prep surfaces such as 46 (as called for by the location in the bundle of the particular stub).

An arcuate groove 47 of generally V-shaped cross-section is formed in the head 45 of stub 43, this groove having a circumferential length equal to the circumferential length of the concave surface (and also equal to the total circumferential length of all of the curve-bounded surfaces 46). Thus, for the particular stub illustrated in FIGS. 23–27 (with two special surfaces), groove 47 has a length of 120°; for a stub with one special surface, the groove would have a length of 60°; for a stub with three special surfaces, the groove would have a length of 180°. The radially inner wall of groove 47 is a frusto-conical surface which makes an angle of 30° (for example) with the longitudinal axis of the stub, while the radially outer wall of this groove is arcuate in cross-section (as illustrated in FIG. 26), the center for this arc being coincident with the center for the outer concave surface area of the stub and the radius for this wall of the groove being $R + t$, where R is equal to 3r and t is the thickness of the tube wall. In this connection, it is pointed out that the radius of the bottom of groove 47 (measured in the plane of the hexagonal end face of stub head 45, from the center of this end face) is illustrated to scale in FIG. 23; however, for purposes of clarity of illustration, in FIGS. 14, 16, 19, 20, 21, and 22 this radius is shown as somewhat less than it actually would be.

Since the curvature, radius R (see FIG. 26), of the "special" stubs such as that illustrated matches that of the flared tube ends (FIG. 1b), the finished weld preps (having the shape of surfaces 46) produced on the "special" stubs such as 43 by the rack hob will exactly match those produced on the tubes to which the "special" solid stubs are to be welded.

Refer now to FIGS. 12–13. These figures illustrate a tube shuttle 5 of the type previously described (see FIGS. 4–8) having loaded therein (preparatory to rack hobbing) three flared tubes 1a–1c (which extend through both halves of the dual shuttle) and four bolts 4a–4d with "finish stock" in each half of the dual shuttle (there thus being a total of four pairs of bolts in the dual shuttle). The diameter of the cylindrical shank portion of each of the bolts 4 is equal to that of the unflared portion of tubes 1, so that these shank portions will fit within the respective grooves 8, 10 and will be held securely therein by means of tape 11.

By means of the rack hob previously described (FIGS. 10–11), half hexagonal weld preps are machined on the bottom halves of the ends of the flared tubes 1a–1c and on the bottom halves of the ends of the solid stubs 4a–4d (and also on the opposite ends of the flared tubes and on the solid stubs at the far side of the fixture, by means of the duplicate rack hob), in one pass of the rack hob. The half hexagon weld preps machined into the solid stub ends, like those machined into the flared tube ends, are parallel to the respective bolt axis. In FIG. 13, the outer rough or unfinished outline (prior to hobbing) for a "finish stock" element such as 4a is illustrated at U, while the inner hobbed outline (or weld prepped outline) for such element is illustrated at H. Although a complete hexagon is illustrated at H, it should be apparent, from what has gone before, that only a half hexagon (on the bottom half of the stub), plus run-out on each side, is machined at a time on each of the solid stubs (like the machining of a half hexagon at a time, plus run-out on each side, on the flared tubes).

The shuttle 5 as disclosed has a capacity of seven cylindrical members (flared tubes, solid stubs, or a combination of tubes and stubs). However, this is merely for purposes of illustration, and the capacity of the shuttle (measured in cylindrical members) may be much greater than this. It is again pointed out that the machining *by rack hobbing) of the weld preps, and also the subsequent welding, is done on one complete row of cylindrical members at a time, whatever the number of such members may be, within, of course, the holding capacity of the shuttle or fixture 5.

Figure 14:
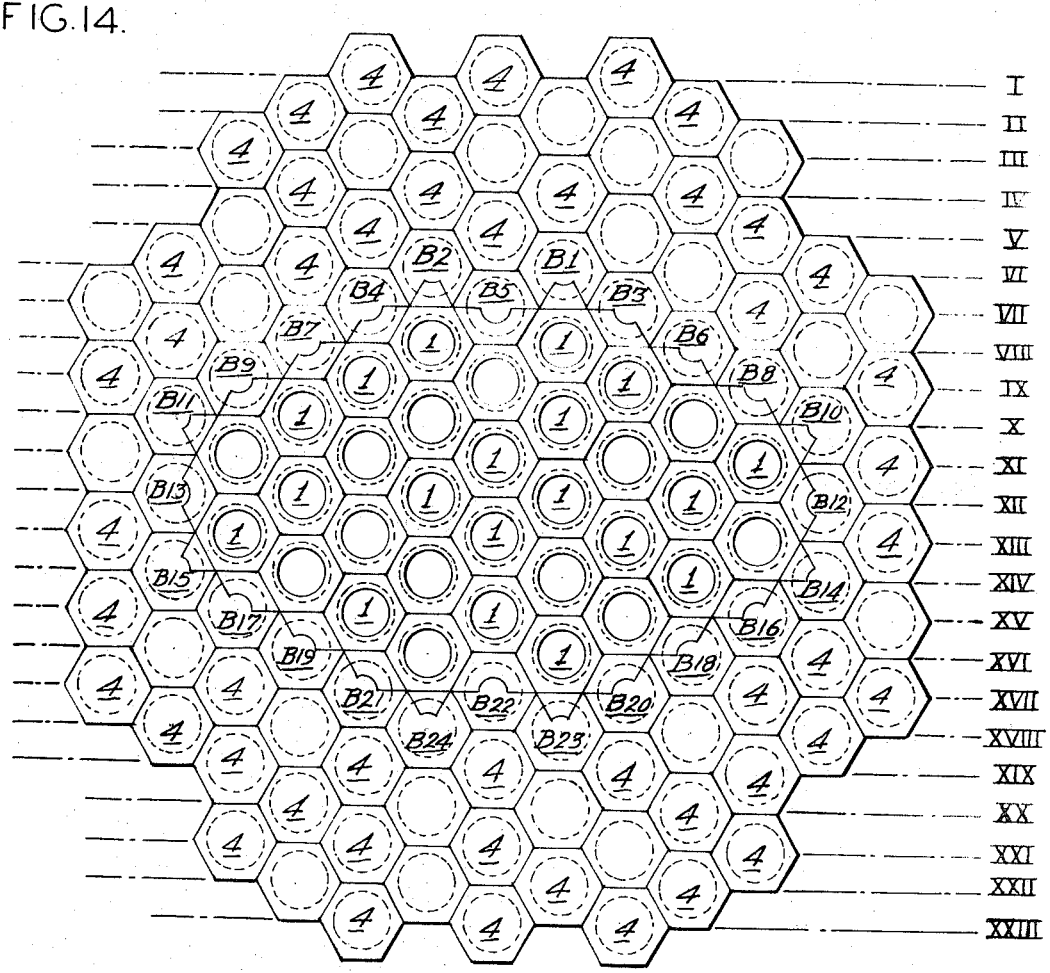
FIG. 14 is a front elevation of a typical assembled heat exchanger tube bundle, showing the tubes and flange material after they have been joined together.
Figure 15:
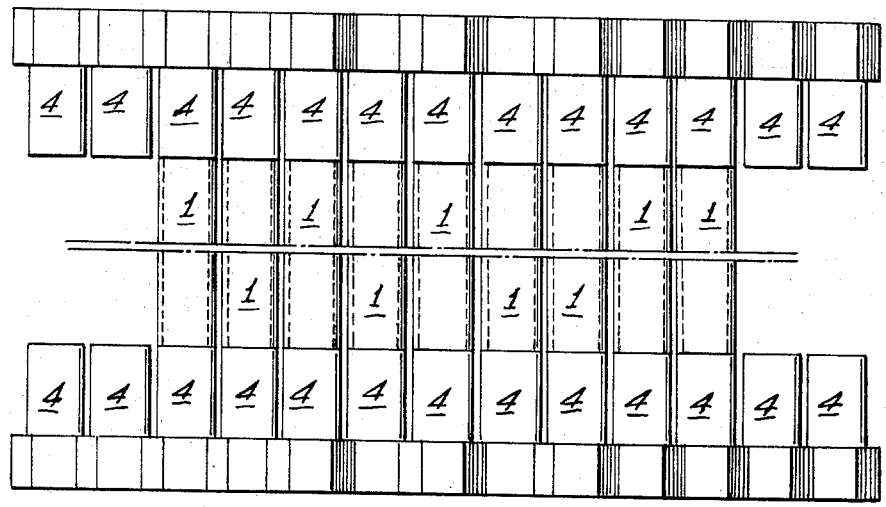
FIG. 15 is a plan view of the assembled structure of FIG. 14.
Figure 16:
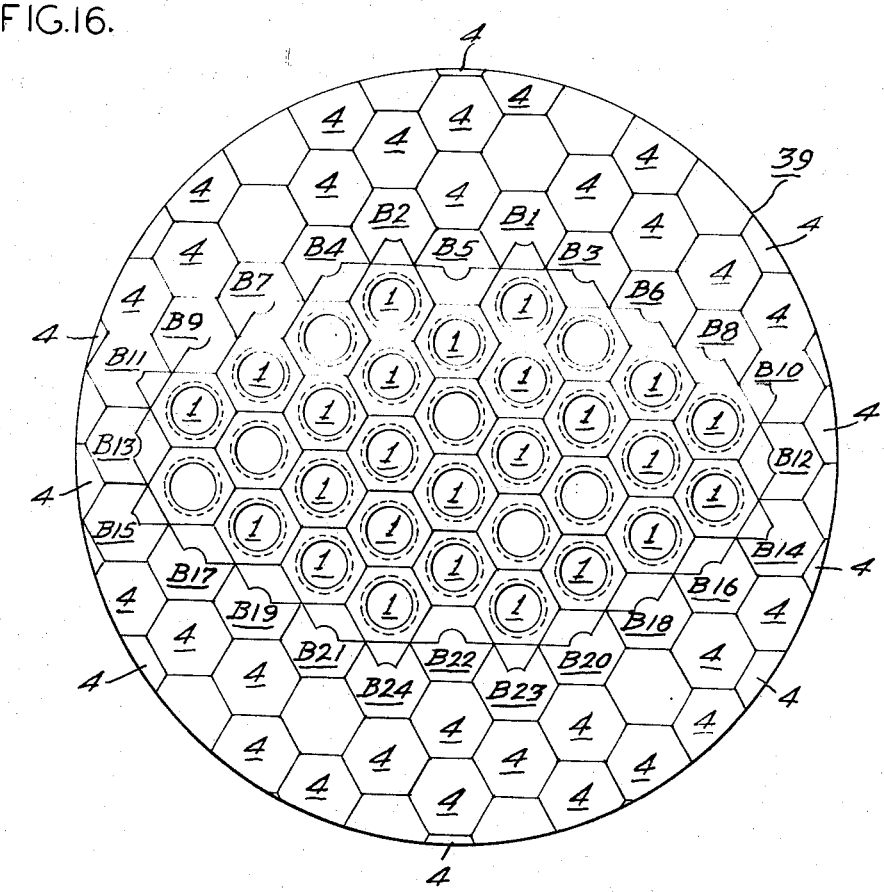
FIG. 16 is a front elevation of a finished heat exchanger tube bundle.
Figure 17:
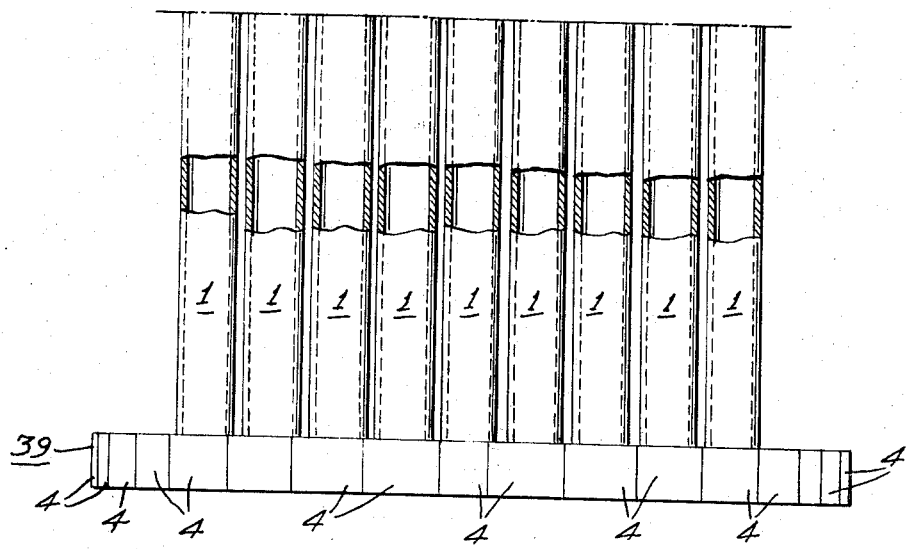
FIG. 17 is a plan view showing one side of the finished tube bundle structure of FIG. 16.

Refer now to FIGS. 14–17, which illustrate various stages during the finishing of a complete heat exchanger tube bundle, of the type generally referred to hereinabove, after the component elements (tubes and solid stubs) have been joined together by welding. FIGS. 14 and 15 illustrate the all-welded tube bundle after the tubes and flange material (solid stubs) have been joined together by welding, while FIGS. 16 and 17 illustrate the finished (machined) tube and flange structure which constitutes the completed bundle. In connection with these figures, it is pointed out that the boundaries of the individual tubes and solid stubs (that is to say, the joints between these individual members) would of course actually not be visible after the welding operation has been completed; however, such boundaries or joints are shown in these figures for purposes of explanation. In these figures, 32 tubes are shown in the bundle, merely for purposes of illustration; the number of tubes in a bundle may, in many cases, be much larger than this.

FIG. 14 is a front elevation of the welded but unfinished tube bundle, and clearly shows the hexagonal outlines of the weld preps which are machined (by rack hobbing, in three steps relative to any one element, flared tube or solid stub) on the flared tubes and on the solid stubs. The honeycomb configuration of the complete assembly is clearly shown in this figure. In describing FIG. 14, reference will be made to the several horizontal rows of cylindrical members, since the machining of the weld preps on these members (using the dual shuttle 5 and the rack hobs 30, 30′ previously described) is performed on one complete row at a time. The rows are numbered consecutively from I to XXIII in FIG. 14, beginning at the top of this figure.

Row I comprises three solid stubs or bolts, all "finish stock"; Row II, four bolts, all "finish stock"; Row III, five bolts, all "finish stock"; Row IV, four bolts, all "finish stock"; Row V, five bolts, all "finish stock"; Row VI, six bolts total, four bolts being "finish stock" and two bolts B1 and B2 each being preformed with one curve-bounded surface, for joining to tubes; Row VII, seven bolts total, four bolts being "finish stock," two bolts B3 and B4 each being preformed with two curve-bounded surfaces and bolt B5 being preformed with three curve-bounded surfaces; Row VIII, four bolts and two tubes total, two bolts being "finish stock" and two bolts B6 and B7 each being preformed with two curve-bounded surfaces; Row IX, four bolts and three tubes total, two bolts being "finish stock" and two bolts B8 and B9 each being preformed with two curve-bounded surfaces; Row X, two bolts and four tubes, bolts B10 and B11 each being preformed with one curve-bounded surface; Row XI, two bolts and five tubes, both bolts being "finished stock"; Row XII, two bolts and four tubes, bolts B12 and B13 each being preformed with two curve-bounded surfaces; Row XIII, two bolts and five tubes, both bolts being "finish stock"; Row XIV, two bolts and four tubes, bolts B14 and B15 each being preformed with one curve-bounded surface; Row XV, four bolts and three tubes total, two bolts being "finish stock" and two bolts B16 and B17 each being preformed with two curve-bounded surfaces; Row XVI, four bolts and two tubes total, two bolts being "finish stock" and two bolts B18 and B19 each being preformed with two curve-bounded surfaces; Row XVII, seven bolts total, four bolts being "finish stock," two bolts B20 and B21 each being preformed with two curve-bounded surfaces and bolt B22 being preformed with three curve-bounded surfaces; Row XVIII, six bolts total, four bolts being "finish stock" and two bolts B23 and B24 each being preformed with one curve-bounded surface; Row XIX, five bolts, all "finish stock"; Row XX, four bolts, all "finish stock"; Row XXI, five bolts, all "finish stock"; Row XXII, four bolts, all "finish stock"; Row XXIII, three bolts, all "finish stock."

FIG. 15 is a plan view of the welded-together tube bundle structure of FIG. 14, showing the tubes 1 and the bolts 4 in their assembled arrangement. The cylindrical shanks of the hexagonal-headed bolts or stubs 4 can be seen clearly in this figure, there being a bolt at each end or side of the bundle corresponding to bolts B1, B2, etc., in FIG. 14.

FIGS. 16 and 17 illustrate a finished (completed) tube bundle according to this invention. The welded-together structure of FIGS. 14 and 15 is machined to provide the finished bundle. The outer boundary of the solid stubs 4 is machined to provide a cylindrical outer configuration for the bundle, a mounting flange 39 (provided by the stubs 4 at one end of the bundle, and having a length, measured parallel to the axes of the tubes 1, essentially equal to the length of the hexagonal head portions of these stubs) being formed at one end of the tube bundle and a similar mounting flange (provided by the stubs at the other end of the bundle, and having a length, measured parallel to the axes of the tubes 1, essentially equal to the length of the hexagonal head portions of these last-mentioned stubs) being formed at the other end of the tube bundle. The cylindrical shank portions of all of the bolts or stubs, at both ends of the tube bundle, are machined away, as illustrated in FIG. 17 (compared with FIG. 15). As illustrated in both FIGS. 15 and 17, the flaring of the tubes 1 at both ends of the bundle, and the welding together of these tubes along surfaces which are radially outside of the main portions of the tubes, results in the central portions of the tubes being spaced or separated from each other. That is to say, spaces are provided between the several tubes, in the body of the bundle, and in the assembled heat exchanger the shell fluid can circulate through these spaces, as required for heat exchange action.

The building up of the flange material from solid stubs (bolts) has been previously described, in connection with FIGS. 12–17. Alternatively, two one-piece flanges, each machined from solid stock, could be utilized, one flange for each of the two ends of the tube bundle. EAch such one-piece flange would have formed therein, by machining, an irregular central hole whose periphery exactly matches that of an array of heat exchanger tubes, for example the array of 32 tubes previously described in connection with FIG. 14; individual surfaces would be formed at the edges of the flange hole which exactly match, respectively, the weld preps formed on the outer boundary of the tube array. Then, the array of tubes would be joined at each end to the respective machined flange, by welding, along the respective abutting (matching) surfaces. In this case, a final machining (after welding) might not be necessary.

Figure 18:
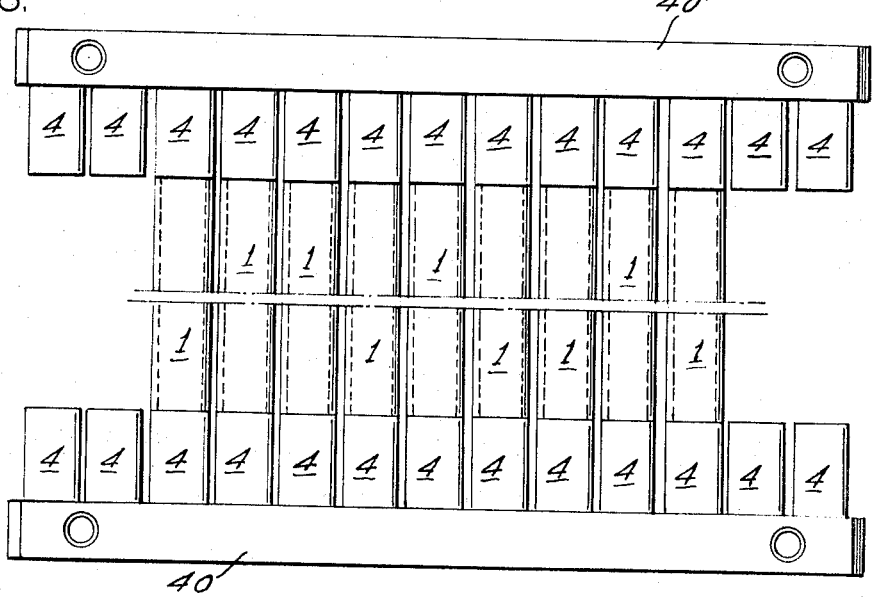
FIG. 18 is a plan view of another form of heat exchanger tube bundle, showing the tubes and flange material joined together.
Figure 19:
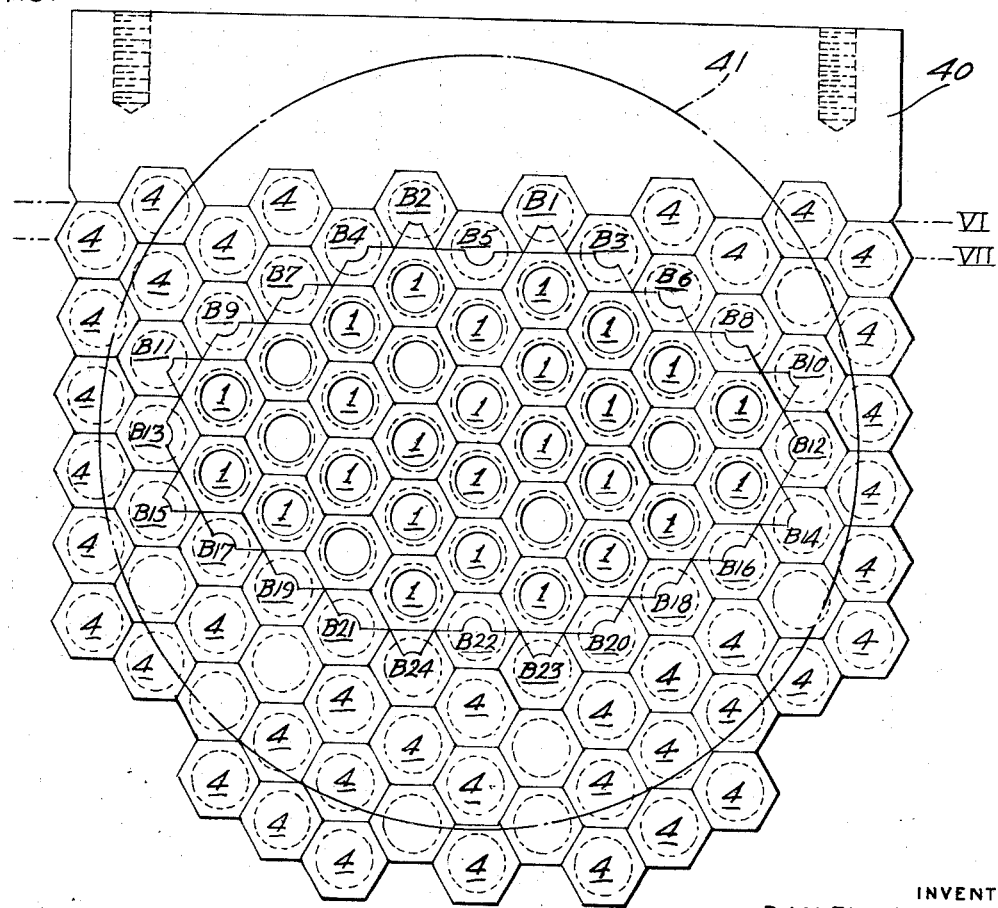
FIG. 19 is a front elevation of the bundle of FIG. 18.

Refer now to FIGS. 18 and 19. Instead of using only solid stubs for the building up of the flange material, as in FIGS. 12–17, a multi-piece flange construction can be employed. Such a construction can be more economical than one using only solid stubs. The multi-piece flange construction includes a pair of full-depth starting bars 40 and 40', one at each end of the tube bundle (see FIG. 18), plus solid stubs, to constitute the flange material. Each of the starting bars such as 40 is directly joined (welded) to the first row of bolts (stubs) 4 which is joined (welded) to the tubes 1, and also to the second row of bolts. These rows would be those denoted by VI in FIG. 14 (including bolts B1 and B2) and by VII (including bolts B3, B4, and B5).

Each of the two starting bars 40 and 40' is a solid block of material of the same length (measured in a direction parallel to the axes of the tubes 1) as the hexagonal heads of bolts 4, and each is machined on its lower face to provide a continuous row of weld preps (surfaces) arranged as half hexagons, these surfaces all extending parallel to the upper face of the respective starting bar and to the axes of tubes 1. In the welded tube bundle, starting bar 40 and starting bar 40' are each welded, at the respective opposite ends of the bundle, to the six respective bolts (stubs) 4 in the row corresponding to Row VI of FIG. 14, and also to the seven bolts in the row corresponding to Row VII; this welding is done along the half hexagonal weld preps machined on the lower faces of the starting bars, and along the abutting upper half hexagonal surfaces of these thirteen bolts (at each end of the bundle).

Below Row VII, the all-welded construction of the bundle continues with solid stubs and tubes, exactly as previously described in connection with FIG. 14.

The welded composite structure (tubes, stubs, and starting bars), for finishing, is machined along the cylindrical surface indicated by the dot-dash circle 41, at each end of the bundle, in the same manner as previously described in connection with FIGS. 16 and 17, to remove excess material and to provide the required cylindrical mounting flanges. Also, the cylindrical shanks of the bolts or stubs 4 are cut off, as previously described, so that these shanks will not interfere with the flow of heat exchanger shell fluid around the outside of the tubes 1.

Figure 20:
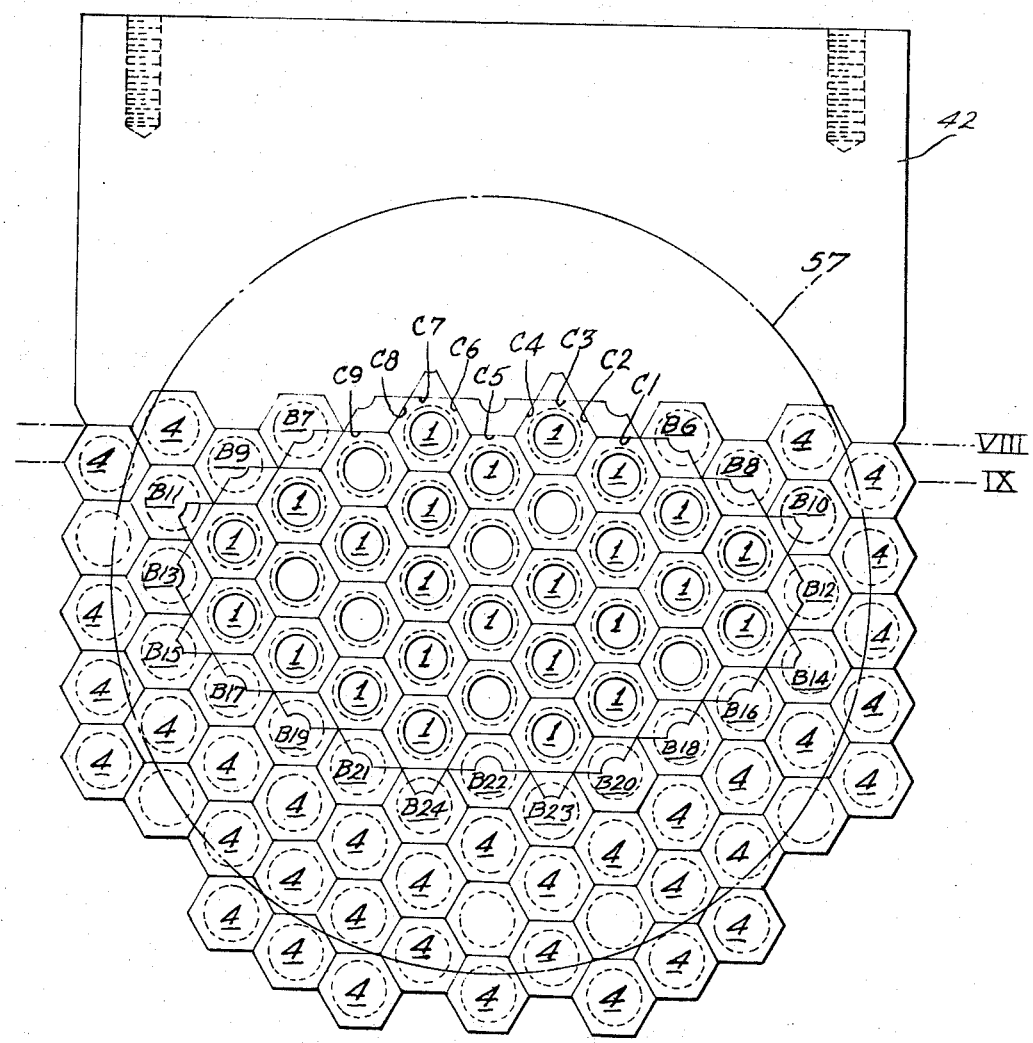
FIG. 20 is a front elevation of yet another form of heat exchanger tube bundle, showing the tubes and flange material joined together.

Now refer to FIG. 20. This shows again a multipiece flange construction, including a pair of full-depth starting bars (only one of which is visible in FIG. 20), but in this case the starting bars are directly joined (welded) to the uppermost row which includes tubes (this corresponds to Row VIII in FIG. 14), and to the row immediately below (this latter corresponds to Row IX in FIG. 14). Row VIII includes bolts B6 and B7, and Row IX includes bolts B8 and B9.

The construction of FIG. 20 includes a pair of full-depth starting bars such as 42, one at each end of the tube bundle, plus solid stubs, to constitute the flange material. Each of the starting bars such as 42 is directly joined (welded) to the first row of tubes 1 (and also, of course, to the bolts or stubs in this same row, including bolts B6 and B7), and is also directly joined (welded) to the second row of tubes (as well as to the bolts in this same row, including bolts B8 and B9).

Each of the two starting bars such as 42 is a solid block of material of the same length (measured in a direction parallel to the axes of the tubes 1) as the hexagonal heads of bolts 4, and each is machined on its lower face to provide a continuous row of weld preps (surfaces) arranged generally as half hexagons, these surfaces all extending parallel to the upper face of the respective starting bar and to the axes of the tubes 1. The majority of these surfaces are straight-edged, but nine surfaces C1 through C9 are formed as curve-bounded surfaces, for joining to tubes; the curvature of these latter surfaces matches that of the flared tube ends, just as previously described for bolts B1, B2, etc., (FIG. 14). Surfaces C2, C3, C4, C6, C7, and C8 are formed for joining to tubes in the uppermost row of tubes (Row VIII), while surfaces C1, C5, and C9 are formed for joining to tubes in the second row of tubes (Row IX). In the welded tube bundle of FIG. 20, the starting bars such as 42 are each welded, at the respective opposite ends of the bundle, to the respective bolts and tubes (four bolts and two tubes total) in the row corresponding to Row VIII of FIG. 14, and also to the respective bolts and tubes (four bolts and three tubes total) in the row corresponding to Row IX; this welding is done along the weld preps machined on the lower faces of the starting bars, and along the abutting weld preps formed on the total of eight bolts and five tubes.

Below Row IX, the all-welded construction of the bundle continues with solid stubs and tubes, exactly as previously described in connection with FIG. 14.

The welded composite structure (tubes, stubs, and starting bars), for finishing, is machined along the cylindrical surface indicated by the dot-dash circle 57, at each end of the bundle, in the same manner as previously described in connection with FIGS. 16 and 17, to remove excess material and to provide the required cylindrical mounting flanges. Also, the cylindrical shanks of the bolts or stubs 4 are cut off, as previously described, so that these shanks will not interfere with the flow of heat exchanger shell fluid around the outside of the tubes 1.

The machining of the weld preps on flared tubes and also on the ends of solid stubs, by rack hobbing, while such tubes and/or solid stubs (bolts) are held in a row in a tube shuttle (fixture), has previously been described, particularly in connection with FIGS. 10-11.

After such machining of unwelded tubes (and solid stubs, if any) in the tube shuttle, they are cleaned preparatory to welding.

In a somewhat similar manner, previously welded tubes (and solid stubs, if any, in the same row and/or in the row immediately above) in the tube bundle are machined and cleaned. Then, the unwelded tubes (and solid stubs, if any) are moved into position and electron beam welded in place. All the welding of the weld preps on both tubes and solid stub ends is performed on one complete (matched) row at a time, and in one pass of the electron beam welding head.

Refer now to FIGS. 21 and 22, which illustrate, somewhat schematically, a concept of apparatus which is envisioned for the fabrication of heat exchanger tube bundles according to the present invention. The heat exchanger tubes are cut to length, faced, and flared on both ends, as previously described in connection with FIGS. 1a-1b. Following this, the flared tubes and/or solid stubs are loaded in the dual tube shuttle 5 in one complete row, and clamped to it using high strength woven metal or glass fiber tape 11, as previously described. The two frame members of the shuttle are attached to a shaft 7, as previously described, and this shaft is journaled for rotation (about an essentially horizontal axis) in a relatively fixed and massive overall frame and vacuum tank (not shown). Such frame is supported upon suitable slideways fixed to a floor or other suitable supporting surface.

The rack hob 30 (previously described) is carried by a slide which is adapted to slide under the tube shuttle 5. Half hexagonal weld preps are machined on the bottom halves of the flared tube ends and solid stub ends using rack hob 30, which operates in the manner described hereinabove. It will be recalled that this operation is performed simultaneously on both ends of the flared tubes, and on pairs of aligned solid stubs, using a separate rack hob at the far side of the dual shuttle 5, as previously described in connection with FIGS. 10 and 11.

By way of example, it is assumed (in FIGS. 21-22) that the multi-piece flange construction illustrated in FIGS. 18-19 is being employed, including the full-depth starting bar 40. In FIG. 21, the weld preps have just been machined (by rack hobbing) on the bottom halves of the row corresponding to Row IX (FIG. 14), which row is held in the tube shuttle 5 at the left-hand side of FIG. 21. It will be recalled that Row IX comprises four bolts and three tubes total, two bolts being "finish stock" and two bolts B8 and B9 each being preformed with two curve-bounded surfaces.

Simultaneously with the rack hobbing (of the cylindrical members in tube shuttle 5), the flared tube weld preps are deburred by burring cutters whose cutting teeth synchronously intermesh with those of the rack hob. (Note that deburring is also carried on at the other side of the dual shuttle 5, simultaneously with the rack hobbing taking place thereat).

The tube bundle 51 being fabricated is supported in the apparatus of FIGS. 21-22 by a tube bundle pallet 53 which is bolted at 52 to the starting bar 40. As depicted in FIG. 18, a similar starting bar 40', receptive of similar bolts, is employed at the other end of tube bundle 51. The pallet 53 is mounted between upright portions of the frame previously mentioned, and is so mounted in the frame as to permit relative motion between the pallet and the frame, in a direction parallel to the axes of the heat exchanger tubes; this relative motion provides for a variation in tube length, from one bundle to another, and also provides for slipping the pallet into and out of the fabricating apparatus or machine. The pallet 53 is also capable of being indexed in the vertical direction, as indicated by arrows 54. The pallet 53 is further capable of being moved laterally (indexed) one-half the member center-to-center distance (in the row).

At the particular point of time (in the tube bundle fabrication process) illustrated in FIG. 21, the rows corresponding to Rows VI, VII, and VIII (of FIG. 14) have previously been welded (at least partially) into the embryo tube bundle 51 being fabricated, at the right-hand side of FIG. 21. It will be noted that Row VIII includes two tubes.

The rack hob illustrated in FIGS. 10 and 11 is for the tube shuttle 5. A somewhat different rack hob (not shown) is provided for the tube bundle 51, that is, for the cylindrical elements previously welded into the bundle. The rack hob for the tube bundle is more conventional, and does not have any interspersed straight knives such as 34. In the rack hob for the tube bundle, cutter teeth, only, form three weld prep surfaces and also two sharp inside corners at the intersections of these three weld prep surfaces.

To place the previously welded rows of cylindrical members (Row VII and Row VIII) in position for machining, after Row VIII is welded into bundle 51 the bundle is moved up (indexed) one row of members, and moved horizontally or laterally (indexed) one-half the member center-to-center distance (in the row), as required by the row-to-row vertical indexing.

Then, the rack hob for the tube bundle is brought into operative position. Using this rack hob, a complete row of weld preps is formed on the previously welded cylindrical members in the bundle (these members being in Row VII and Row VIII). The half hexagons (for weld preps) which are rack hobbed in this manner on the tube bundle are each provided by three adjacent cylindrical elements whose centers are located at the corners of an isosceles triangle, and the complete row is formed by a succession of these half hexagons. That is to say, the half hexagons are provided by: the lower horizontal faces of four "finished stock" bolts in Row VII; the lower horizontal faces of three bolts B3, B4 and B5 in Row VII (each of which is formed with a plurality of curve-bounded surfaces for welding to tubes); the lower inclined faces of two "finish stock" bolts in Row VIII; the lower inclined faces of two bolts B6 and B7 in Row VIII (each of which is formed with a plurality of curve-bounded surfaces for welding to tubes); and the lower inclined faces of two tubes in Row VIII.

It may be seen, from the above, that for any one cylindrical element, the machining of the weld preps is done in three separate steps. Thus, taking the bolt B6 as an example, the machining of the three upper surfaces of the hexagon ("upper" referred to the completed tube bundle) is done by the rack hob for the tube shuttle 5; the machining of the two lower inclined surfaces is done by the rack hob for the tube bundle (in the step described in the preceding paragraph); and the machining of the lower horizontal face will be done by the rack hob for the tube bundle, in the next succeeding pass of such rack hob.

The rack hob and deburring techniques utilized for the tube bundle 51, as above described, are somewhat similar to those used for the row of cylindrical members mounted in the shuttle 5, and described previously (in connection with FIGS. 10 and 11). In FIG. 21, the row of weld preps (on cylindrical members in Rows VII and VIII) referred to above have just been machined (by rack hobbing).

All machined weld preps, both those on the unwelded members in the tube shuttle 5 and those on the previously welded members in Rows VII and VIII of the bundle 51, are cleaned before welding takes place, using hot solvent cleaning facilities (not shown).

Thereafter, all machining and cleaning components of the bundle fabricating apparatus are withdrawn from the welding area, which is under the tube bundle pallet 53. The welding apparatus, which has been stored under the tube bundle 51 during the machining and cleaning operations, is also withdrawn from the welding area.

Then, the tube shuttle 5, with its row of cylindrical members (in general, tubes and/or solid stubs, the particular Row IX illustrated having both tubes and solid stubs), is rotated 180° (indexed, about the horizontal axis provided by shaft 7), as illustrated in FIG. 22, into position under the tube bundle 51 (specifically, abutting Row VIII, and also, of course, a portion of Row VII), and clamped for welding. This rotation of tube shuttle 5 about the axis of shaft 7, into position under the tube bundle 51 (illustrated in FIG. 22), brings the weld preps on the unwelded row of cylindrical members (tubes plus solid stubs) into abutting relationship with those on the previously welded rows of cylindrical members in the tube bundle, such that a honeycomb-like arrangement is provided (as described hereinabove), and such that through penetration butt welds may be made along the half hexagonal weld prep surfaces, thereby to incorporate the row of cylindrical members carried by the tube shuttle into the embryo tube bundle 51.

Following the positioning and clamping of the shuttle-carried row of cylindrical members as described, the welding apparatus is moved into position for welding. The members are welded in a one-at-a-time sequence, along the weld prep surfaces, to fix in place the new row, the welding being in the form of through penetration butt welds.

Preferably, electron beam welding equipment is utilized for the welding. The electron beam welding head is suitably driven so that the welding beam precision tracks the weld seam that is common to each member (tube or solid stub, in Row IX) and its mating weld prep on the tube bundle bottom (in Rows VII and VIII). The welding head is driven with both articulator and indexing motions. In this way, the unwelded cylindrical members (carried by the shuttle 5) are electron beam welded in place in the tube bundle 51, the welding of the weld preps on both tubes and solid stub ends being performed on one complete new or added row at a time (in the example, this is Row IX) and in one pass of the electron beam welding head.

There is provided, at the other end of tube bundle 51 (that is, at the far side of the frame previously mentioned), electron beam welding apparatus which duplicates the apparatus previously referred to, for welding the far ends of the unwelded cylindrical members in place in the tube bundle, these far ends of the unwelded members being welded to the mating weld preps on the tube bundle bottom, at the far end of such bundle. In this connection, it is pointed out that the apparatus of FIGS. 21–22 also includes, at the far side of the frame mentioned, rack hobbing and deburring components which duplicate those at the near side of the frame (previously described), for machining and deburring weld preps onto the bottom halves of the (welded) members in Rows VII and VIII, at the far end of the tube bundle 51. Also, duplicate cleaning components are provided at the far side of the frame.

A vacuum tank was previously mentioned as incorporated in the apparatus of FIGS. 21–22. It should be apparent to those skilled in the art that, if electron beam welding is being employed, the vacuum tank and vacuum pump usually required for electron beam welding would of course be incorporated into the apparatus now being described.

The cycle is completed upon returning the components to their former positions. This returning includes, of course, the uncoupling of the tube shuttle 5 from the row of cylindrical members which it carried during the machining and welding operations (by withdrawal of the tape which coupled these members to the shuttle), and also the rotation of this fixture back to the position illustrated in FIG. 21.

For the typical fabrication facility described hereinabove, a production schedule has been estimated, and will now be given. It may be noted that the following does not include the cutting to length, facing, and flaring of the tubes, and that the production schedule is for a single row of tubes. Loading of 100 tubes (average row) into the shuttle, 5 minutes; machining of weld preps on 100 tubes in tube shuttle and simultaneously on 100 tube vacancies in tube bundle, 4 minutes; cleaning of machined weld preps, 20 minutes; indexing for welding, 1 minute; closing chamber and pumping down (preparatory to welding), 20 minutes; welding 100 tubes at 6 seconds each, 10 minutes. This gives a total cycle time (estimated) of 60 minutes.

A summary of the advantages (both in cost and in performance) of the tube bundle fabrication technique of this invention will now be presented.

The tubesheet (header), with its material and shipping costs, are eliminated, and also eliminated are the costs of drilling holes in a tubesheet.

The fabrication by welding is low in cost, due to the following: (1) the tubes are flared in only 3 seconds for each end; (2) burr-free weld preps are simultaneously machined on both the cylindrical member and its mating weld joint member in the bundle in 2½ seconds or less, corresponding to a conservative tool cutting speed of 60 feet per minute; (3) each tube weld prep is electron beam welded in 6 seconds or less, corresponding to a conservative welding speed of 25 inches per minute, and this time includes 1 second tube-to-tube index time.

Since every joint is a through penetration butt weld, precluding any relative motion, thermally or otherwise induced, between the joint members, engineered surface protection, in the form of fused porcelain enamel or other media, can be successfully applied and utilized. This provides several benefits. (1) The surface protection eliminates corrosion of bare tube walls in most applications, such as handling sea water in desalination plants. (2) Scale deposits on tube walls can be removed "in situ" through the application of strong acids. In some applications, such as sea water desalination, scale removal may be possible even during operation. (3) The application of engineered surface protection will permit the use of low cost tube materials, such as low carbon steels. (4) Tube diameters and wall thicknesses may be diminished in some cases, to achieve the "compact heat exchanger." This same result may be achieved in other applications not requiring surface protection. (5) In some cases, improved performance will be the direct result of the higher permissible operating temperatures which are possible when using engineered surface protection. In sea water desalination, for instance, raising the maximum operating temperature from 300°F. (the present limit) to 500°F. will almost double the product yield, per pound of steam supply. In aircraft nuclear propulsion systems, which do not necessarily require surface protection, minimizing the temperature drop through the "compact heat exchangers," from reactor output to engine input, would ensure an efficient propulsion system.

As previously stated, the heat exchanger construction of this invention enables engineered surface protection (e.g., in the form of fused porcelain enamel) to be successfully applied and utilized. This provides benefits in other applications, in addition to the desalination plants previously mentioned. Thus, in order to reduce air pollution, hot flue gases exiting from a thermal power/chemical plant (which may typically contain gaseous sulfur compounds) may be cooled in a heat exchanger to convert the noxious gases to condensables; this heat exchanger may be used to preheat the combustion air for the plant, which is advantageous from the standpoint of improvement of overall efficiency.

However, with heat exchangers of conventional type, the minimum gas temperature to which the products of combustion (flue gases) are cooled is an important consideration in the design of air preheaters for combustion air. Ordinarily, it is considered good practice to design so that the temperature of the flue gases leaving the preheater (heat exchanger) does not drop below 300°F., because if this is not done, corrosion may occur as a result of condensation of sulfurous or sulfuric acid; these substances are formed from the sulfur present in most fuels and the water vapor from combustion. The danger of corrosion thus imposes a serious temperature limitation, with conventional heat exchangers (air preheaters).

On the other hand, with surface-protected heat exchangers (which are eminently practical with the heat exchanger construction of this invention), no corrosion danger exists, and therefore no temperature limitation is imposed. A porcelain-enameled air preheater may cool the flue gases down to ambient temperature. It has been stated that, using conventional air preheaters, the overall efficiency is improved from 3 to 5 percent with preheated combustion air. However, with stack gases (flue gases) exiting from the preheater at approximately ambient temperatures, an additional efficiency of 1 to 3 percent or more may be expected. From the depollution standpoint, there is a considerable improvement, sulfurous acid, sulfuric acid, and other compounds normally liquid at ambient temperatures (say 100°F.) are condensed out of the flue gases.

If desired, the principles of this invention may be utilized to build another porcelain-enameled tubular, feedback heat exchanger of large surface area, operating at depressed (freezing) temperature, and coupled to receive flue gases from the air preheater (heat exchanger) previously mentioned.

I claim:

1. In the fabrication of a heat exchanger, the steps which comprise utilizing a rack hobbing technique to machine three surfaces arranged as half a hexagon on one end of each cylindrical member in a row of members to be added to other members assembled in a bundle, each surface being parallel to the respective member axis; utilizing a rack hobbing technique to machine, for each of said cylindrical members, surfaces on one end of two adjacent cylindrical members in the last row of assembled members in the bundle and on one end of one cylindrical member in the next-to-last row of assembled members in the bundle, the centers of each such set of three members being located at the corners of a triangle and each of said last-mentioned surfaces being parallel to the respective member axis; positioning the first-mentioned row of members so that the half hexagonal surfaces machined thereon abut the similar surfaces machined on the last and next-to-last rows of assembled members, and joining the first-mentioned row of members to the last and next-to-last rows of assembled members along the abutting half hexagonal surfaces.

2. Process according to claim 1, wherein said joining comprises making through penetration butt welds at all of the abutting half hexagonal surfaces.

3. Process defined in claim 1, wherein one of the rows of cylindrical members includes both tubular members and solid members.

4. In the fabrication of a heat exchanger, the steps which comprise machining three surfaces arranged as half a hexagon on one end of each cylindrical member in a row of members to be added to other members assembled in a bundle, each surface being parallel to the respective member axis; machining, for each of said cylindrical members, surfaces on one end of two adjacent cylindrical members in the last row of assembled members in the bundle and on one end of one cylindrical member in the next-to-last row of assembled members in the bundle, the centers of each such set of three members being located at the corners of a triangle and each of said last-mentioned surfaces being parallel to the respective member axis; positioning the first-mentioned row of members so that the half hexagonal surfaces machined thereon abut the similar surfaces machined on the last and next-to-last rows of assembled members, and welding, by through penetration butt welds, the first-mentioned row of members to the last and next-to-last rows of assembled members along the abutting half hexagonal surfaces.

5. Apparatus for fabricating a heat exchanger, comprising means holding a plurality of cylindrical members in parallel, spaced relation to constitute a row of members, and rack hobbing means for machining on one end of each member, while so held, three surfaces arranged as half a hexagon, each surface being parallel to the respective member axis; said holding means being movable to position said row of members as a unit so that the half hexagonal surfaces machined on such members respectively abut similar surfaces machined on other rows of cylindrical members, thereby to enable the first-mentiond row of members to be joined to said other rows of members along the abutting half hexagonal surfaces.

6. Apparatus set forth in claim 5, wherein said rack hobbing means comprises a rack hob having a plurality of cutters arranged to cut three half hexagonal surfaces on each of the first-mentioned cylindrical members in a single pass along the first-mentioned row of members.

7. Apparatus defined in claim 5, wherein one of the rows of cylindrical members includes both tubular members and solid members.

8. Apparatus set forth in claim 5, wherein said holding means comprises a frame providing a plurality of spaced, curved member-receiving elements whose centers of curvature all lie substantially in a common plane, means for securing said first-mentioned cylindrical members in position in said frame, one member in each respective one of said receiving elements, and means mounting said frame for rotation about an axis parallel to the axes of said first-mentioned members, thereby to provide for movement of said first-mentioned row of members as a unit.

9. Apparatus according to claim 5, including also means for welding the first-mentioned row of members to said other rows of members along the abutting half hexagonal surfaces.

10. Apparatus of claim 9, wherein said welding means operates to effect through penetration butt welds between said first-mentioned row of members and said other rows of members.

11. Apparatus for fabricating a heat exchanger, comprising means holding a plurality of cylindrical members in parallel, spaced relation to constitute a row of members, means for machining on one end of each member, while so held, three surfaces arranged as half a hexagon, each surface being parallel to the respective member axis; said holding means being movable to position said row of members as a unit so that the half hexagonal surfaces machined on such members respectively abut similar surfaces machined on other rows of cylindrical members; and welding means operating to effect through penetration butt welds between the first-mentioned row of members and said other rows of members at the abutting half hexagonal surfaces.

* * * * *